Patented Nov. 14, 1933

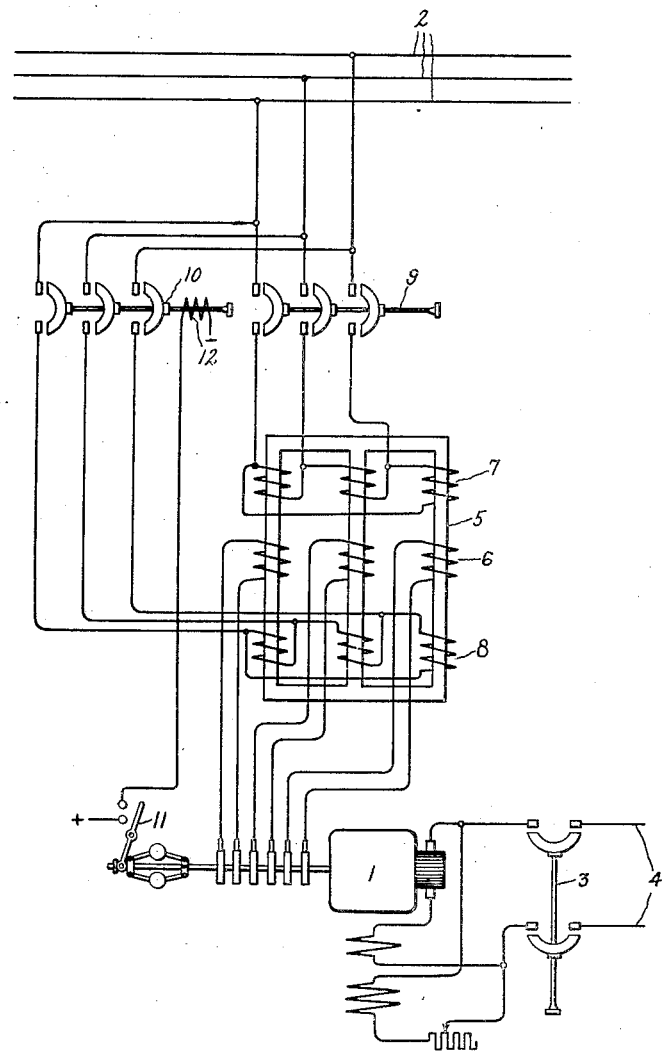

1,935,429

UNITED STATES PATENT OFFICE 1,935,429

STARTING APPARATUS

Theophilus F. Barton, Upper Montclair, N. J., assignor to General Electric Company, a corporation of New York Application May 26, 1932. Serial No. 613,672

6 Claims. (Cl. 172—289)

My invention relates to starting apparatus and particularly to apparatus for starting alternating current dynamo-electric machines such as induction motors, synchronous motors, rotary converters and the like. One object of my invention is to provide an improved arrangement for starting such a machine by applying a subnormal voltage to the alternating current winding of the machine until the machine reaches substantially its normal speed, said arrangement being such that only a relatively small amount of auxiliary apparatus is employed and the supply of starting current to the machine during the starting operation is not interrupted.

In accordance with my invention, I provide between the alternating current winding of the machine and the alternating current supply circuit suitable transforming means which has a plurality of parallel connected windings which are so arranged that the reactance between the supply circuit and the alternating current winding of the machine is greater when only one of the parallel connected windings is in service than when all of them are in service. Preferably, the parallel connected windings of the transforming means are primary windings and suitable switching means are provided whereby the primary windings may be successively connected to the supply circuit.

My invention will be better understood from the following description when taken in connection with the accompanying drawing which diagrammatically illustrates the apparatus for starting a rotary converter in accordance with my invention and its scope will be pointed out in the appended claims.

Referring to the drawing, 1 represents a rotary converter, the alternating current side of which is arranged to be supplied with current from a suitable three-phase supply circuit 2 and the direct current side of which is arranged to be connected by a suitable circuit breaker 3 to a direct current load circuit 4. Interposed between the supply circuit 2 and the alternating current side of the converter 1, I provide in accordance with my invention suitable transforming means, examples of which are well known in the art, whereby the reactance between the supply circuit 2 and the converter 1 is materially greater when only a portion of the windings of the transforming means are energized than when all of them are energized. In the particular embodiment of my invention shown in the drawing, the transforming means which I employ is a three-phase transformer 5 which has its secondary winding 6 connected to the alternating current terminals of the rotary converter 1, and which has two three-phase delta connected primary windings 7 and 8 which are arranged to be connected to the supply circuit 2 by suitable switches 9 and 10 respectively. The primary windings 7 and 8 are arranged on the core of the transformer 5 in any suitable manner, examples of which are well known in the art, so that when only one of the primary windings is connected to the supply circuit the reactance between it and the secondary winding 6 of the transformer is materially higher than the reactance between both of the primary windings and the secondary winding when both of the primary windings are connected in parallel across the supply circuit.

In the particular arrangement shown in the drawing the converter 1 is arranged to be started by first closing the switch 9 in any suitable manner so that the primary winding 7 of the transformer 5 is energized. When the converter reaches a predetermined speed, the switch 10 is closed to connect the primary winding 8 in parallel with the primary winding 7. Any suitable speed responsive means, such as a centrifugally operated speed switch 11, may be provided for automatically completing an energizing circuit for a closing coil 12 on the switch 10, when the converter reaches a predetermined speed.

The operation of the arrangement shown in the drawing is as follows: When it is desired to start the converter 1, the switch 9 is closed so as to connect the primary winding 7 of the transformer 5 to the supply circuit 2. Due to the high reactance between the primary winding 7 and the secondary winding 6 when the circuit of the primary winding 8 is opened, a relatively low voltage is applied to the armature winding of the converter 1 to effect the starting thereof. In this manner, a reduced starting current is obtained. When the converter reaches a predetermined speed, the centrifugally operated speed switch 11 closes its contacts and completes an energizing circuit for the closing coil 12 so that the switch 10 is closed to connect the primary winding 8 of the transformer 5 to the supply circuit 2. Since the reactance of the transformer 5 is materially decreased by the connection of the primary winding 8 in parallel to the primary winding 7 normal voltage is now applied to the armature winding of the converter. After the switch 10 is closed, the switch 3 may be closed in any suitable manner so that the direct current side of the converter 1 is connected to the load circuit 4.

Not only does my invention require a minimum amount of switching apparatus but it will be observed that also there is no interruption in the supply of current to the armature winding during the starting operation of the machine.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current supply circuit, a transformer having three independent windings arranged so that the reactance of the transformer is materially greater when only two of said windings are energized than the reactance when all of the windings are energized and the third winding is connected in parallel with one of said two windings, an alternating current motor connected to one of said two windings, means for connecting the other of said two windings to said supply circuit, and means for connecting the third winding in parallel with one of the other windings.

2. In combination, an alternating current supply circuit, a transformer having two independent primary windings and a secondary winding arranged so that the reactance between one of said primary windings and the secondary winding is materially greater than the reactance between both of said primary windings and the secondary winding, an alternating current motor connected to said secondary winding, and means for successively connecting said primary windings to said supply circuit.

3. In combination, an alternating current supply circuit, a transformer having two independent primary windings and a secondary winding arranged so that the reactance between one of said primary windings and the secondary winding is materially greater than the reactance between both of said primary windings and the secondary winding, an alternating current motor connected to said secondary winding, means for connecting one of said primary windings to said supply circuit, and means for connecting the other primary winding to said supply circuit when the motor reaches a predetermined speed.

4. In combination, an alternating current supply circuit, a transformer having three independent windings arranged so that the reactance of the transformer is materially greater when only two of said windings are energized than the reactance when all of the windings are energized and the third winding is connected in parallel with one of said two windings, an alternating current motor connected to one of said two windings, means for connecting the other of said two windings to said supply circuit and means for connecting said third winding in parallel with one of the other windings when the motor reaches a predetermined speed.

5. In combination, an alternating current supply circuit, an alternating current motor, transforming means connected to said machine and including a plurality of primary windings, and means for successively connecting said primary windings to said supply circuit.

6. In combination, a three-phase supply circuit, an alternating current machine and means for starting said machine including a transformer having its secondary winding connected to said machine and two three-phase delta connected primary windings, and means for successively connecting said primary windings to said supply circuit.

THEOPHILUS F. BARTON.